US005633777A

United States Patent [19]

Boy et al.

[11] Patent Number: 5,633,777

[45] Date of Patent: May 27, 1997

[54] GAS-FILLED, THREE-ELECTRODE OVERVOLTAGE SURGE ARRESTER FOR LARGE SWITCHING CAPACITIES

[75] Inventors: Jürgen Boy; Gerhard Lange, both of Berlin, Germany

[73] Assignee: Siemens Aktiengesellschaft, Munich, Germany

[21] Appl. No.: 542,850

[22] Filed: Oct. 13, 1995

[30] Foreign Application Priority Data

| | | | |
|---|---|---|---|
| Oct. 13, 1994 | [DE] | Germany | 44 37 817.3 |
| Nov. 30, 1994 | [DE] | Germany | 44 44 515.6 |

[51] Int. Cl.[6] .......... H02H 1/00

[52] U.S. Cl. .......... 361/17; 361/120

[58] Field of Search .......... 361/56, 111, 117, 361/91, 120; 337/21, 28; 313/231.11

[56] References Cited

U.S. PATENT DOCUMENTS

| | | | |
|---|---|---|---|
| 3,254,179 | 5/1966 | Howard | 337/18 |
| 3,289,027 | 11/1966 | Jones | 313/231 |
| 3,885,203 | 5/1975 | Baker et al. | 361/117 |
| 4,062,054 | 12/1977 | Simokat | 361/119 |
| 4,212,047 | 7/1980 | Napiorkowski | 361/124 |
| 4,433,354 | 2/1984 | Lange et al. | 361/120 |
| 4,769,736 | 9/1988 | Boy | 361/120 |

FOREIGN PATENT DOCUMENTS

| | | |
|---|---|---|
| 2181887 | 4/1987 | United Kingdom . |

*Primary Examiner*—Jeffrey A. Gaffin
*Assistant Examiner*—Sally C. Medley
*Attorney, Agent, or Firm*—Kenyon & Kenyon

[57] ABSTRACT

To adapt a three-electrode arrester having copper electrodes to high switching capacities (200 Amp a.c. current per discharge gap simultaneously for 11 cycles at 60 Hz), the following measures are provided: The cylindrical end electrodes have a volume of at least 60 mm$^3$, given a ratio of length ($L_2$) to diameter ($D_2$) of less than 2.5; the middle electrode has the shape of a hollow cylinder with end regions of a reduced wall thickness; the middle electrode and the hollow cylindrical insulators are soldered to one another at the front ends.

10 Claims, 2 Drawing Sheets

GAS-FILLED, THREE-ELECTRODE OVERVOLTAGE SURGE ARRESTER FOR LARGE SWITCHING CAPACITIES

BACKGROUND OF THE INVENTION

The present invention relates generally to gas-filled overvoltage surge arresters, and more particularly to a gas-filled overvoltage surge arrester, which is essentially comprised of two axially opposed end electrodes, a middle electrode disposed concentrically thereto, and of two hollow cylindrical insulators disposed between the middle electrode and the end electrodes.

Gas-filled overvoltage surge arresters having two end electrodes and a concentric middle electrode, so-called three-electrode arresters, are used in different power classes. One of several characteristic features of each power class is the nominal a.c. discharge current that the arrester must be able to conduct, for example, for one second at 50 Hz or for 11 periods (cycles) at 60 Hz. Discharge currents of this type are on the order of 2.5 to 10 to 20 A (1 sec/50 Hz) per arrester gap; for arresters of a higher power class (heavy duty) on the order, for example, of 90 A (11 cycles/60 Hz) for each arrester gap simultaneously; and in the highest power class (maximum duty) more or less on the order of 200 A (11 cycles, 60 Hz) simultaneously for each arrester gap.

In known three-electrode arresters for the highest power class, the two end electrodes have a pin-type formation and widen in the shape of a crown at the mutually opposing ends. The top area of these electrodes and a section of their shafts are surrounded by a concentrically arranged, tubular middle electrode, into whose ends is inserted in each case a hollow cylindrical insulator, which is radially connected via one part of its peripheral area in a gas-tight manner to the middle electrode. Mounted on the other ends of the two insulators in each case is a metal cap, which, on the one hand, is likewise connected in a gas-tight manner with one section of the peripheral area of the particular insulator, and which, on the other hand, is soldered or welded in a gas-tight manner to the shaft of the particular end electrode. An axial length of about 45 to 50 mm (e.g., see U.S. Pat. Nos. 3,289,027, 3,885,203, and GB-A 2 181 887) is characteristic in the highest power class for commercially available specific embodiments of these known three-electrode arresters.

It is also known, especially with regard to the requirements of the North American market, to provide the mentioned three-electrode arresters with supplementary devices, which, in the event of a too intense heating of the arrester, short-circuit the arrester (fail-safe) or, in the event the arrester becomes leaky, activate an auxiliary discharge gap (vent-safe). For these purposes, one uses members of low-melting metals or meltable insulating foils (e.g., see U.S. Pat. Nos. 4,062,054, 4,212,047, and 3,254,179).

For the above-mentioned lower power classes, three-electrode arresters are also known, in which both the end electrodes, as well as the middle electrode are made of copper, and in which the end electrodes are provided with a flange-type base, while the middle electrode has the form of a hollow cylindrical ring with a radially extending mounting flange. The two hollow cylindrical insulators of the arresters are soldered, on the one hand, at the front ends, to the base of one end electrode and, on the other hand, to the connecting flange of the middle electrode. Also, in such arresters, it is customary to provide the insulators on their inner surface area with ignition (or conductive) strips, which are alternately electrically interfaced with one end electrode and with the middle electrode, and to coat the two end electrodes and/or the middle electrode with an activating compound (e.g., see U.S. Pat. Nos. 4,433,354, and 4,768,736). In commercially available specific embodiments of these known three-electrode arresters having copper electrodes, the cylindrical section of the end electrodes has a diameter of about 2 to 3 mm and an axial length of about 3 to 4 mm, so that the cylindrical section of the end electrodes has a volume of about 20 mm$^3$. The wall thickness of the hollow cylindrical ceramic insulators lies at 0.8–1.5 mm. For three-electrode arresters of this type, one has likewise already provided to develop them in the lower power range with reliable "fail-safe" and/or "vent-safe properties". For this purpose, one can affix a two-arm spring clip, whose ends fit on the front side on the end electrodes of the overvoltage surge arrester, a spacer being disposed therebetween, on the mounting flange of the middle electrode. The end of each arm of the spring clip thereby bears a cap, which is provided with a flange-like rim that serves as a contact ring. This flange-like rim and the base of the particular end electrode oppose one another axially and are kept apart by means of a disk-shaped fusible pellet and a cylindrical component having insulating properties. Either a temperature-resistant insulator or a metal-oxide varistor are used as a cylindrical component (e.g., see U.S. patent application, Ser. No. 08/128,422 filed on Sep. 29, 1993 by the assignee of the present invention). In addition, for the radial contacting of the copper end electrodes of a three-electrode arrester, it has already been proposed to provide the rim existing at the base, at the front end, with a contact ring of a weldable material, whose coefficient of thermal expansion amounts to about $120\times10^{-7}/°$ C., and to weld a connecting wire (or attachment lead) to the outer surface of this contact ring (e.g., see U.S. patent application, Ser. No. 08/290,274 filed on Aug. 15, 1994 by the assignee of the present invention).

The present invention is directed to the problem of developing a gas-filled overvoltage surge arrester with two cylindrical, axially opposing end electrodes made of copper and provided with a flange-like base and having a middle electrode, likewise made of copper, surrounding the two end electrodes over one section of their axial length, in which a hollow cylindrical insulator with a wall thickness of about 1 mm is disposed between the middle electrode and the bases of the end electrodes in each case, which overvoltage surge arrester has the most compact possible construction, i.e., the smallest possible axial and radial dimensions, of the power class "maximum duty" (200 amp. a.c. discharge current each side to ground simultaneously, 11 cycles, 60 Hz), which, without any substantial increase in size, can also fulfill the requirements "fail-safe" and/or "vent-safe".

SUMMARY OF THE INVENTION

The present invention solves this problem by providing that: (a) the cylindrical section of the end electrodes has a volume of at least 60 mm$^3$, the axial length of the cylindrical section being smaller than 2.5-times its diameter, (b) the middle electrode has a hollow cylindrical design, (c) the middle electrode and the hollow cylindrical insulators are soldered to one another at the front ends, (d) the inner surface area of the middle electrode is provided in the regions bordering the two insulators in each case with a radial graduation, and (e) the middle electrode has a wall thickness in the area of the soldered connection points, which amounts at the most to 60% of the wall thickness of the insulator.

An overvoltage surge arrester of this type is distinguished, because of the use of solid and compact copper electrodes, by a high thermal capacity and, thus, by a rapid dissipation of heat in the area of the discharge gaps. The refinement provided of the middle electrode as a hollow cylinder having a front-end soldered region thereby renders possible a very narrow and axially short formation of the arrester as a whole. The total length of the arrester can, therefore, lie at about 20 to 25 mm.

A very short axial length of the three-electrode arrester is achieved when the end electrodes are increased in diameter and shortened in their axial length and, consequently, can be constructed to have an even more compact design. The diameter of the cylindrical section of the end electrodes expediently amounts to at least 4.5 mm. One obtains a noticeable axial shortening of the arrester when the cylindrical section of the end electrodes has a volume of at least 150 $mm^3$, in which case the axial length of the cylindrical section of the end electrodes should be smaller than 1.5-times its diameter, preferably the same or nearly the same as its diameter. As an example, the diameter of the cylindrical section of the end electrodes can amount to about 6 mm.

Depending on the refinement of the end electrodes, the middle electrode, with its area of the inner surface area that is not graduated, surrounds the end electrodes over at least 35% of the length of their cylindrical section.

If a radial contacting of the end electrodes is provided for the new three-electrode overvoltage surge arrester, it is recommended to solder on to the base of each end electrode, at the front end, a contact ring of a weldable material, whose coefficient of thermal expansion amounts to about $120\times10^{-7}$ per ° C., as was already proposed in one of the previously mentioned Patent Applications. A connecting wire can then be welded on to this contact ring.

A three-electrode arrester designed in accordance with the present invention may also be equipped with an additional protective device, as is described in one of the previously mentioned Patent Applications. For a very slender arrester with a considerable axial length, it is recommended to also provide the external surface area of the middle electrode in those areas, which are adjacent to the two insulators, with a radial graduation, and to affix a single-arm spring clip to each graduated area, this spring clip bearing a cap with a flange-like rim at the end of its arm, and abutting with the end of its arm at the front end against the one end electrode, a spacer being disposed there-between, the spacer being comprised of a disk-shaped fusible pellet and a cylindrical component having insulating properties, in particular of a metal-oxide varistor; in addition, it is expedient in this case to use the contact ring that is soldered on to the base of the respective end electrode, at the front end, to radially fix in position and to radially center the cylindrical component having insulating properties. On the other hand, in the case of a three-electrode arrester having a very short axial overall length, but instead a somewhat larger radial thickness, it is recommended to affix to the middle electrode a two-arm spring clip, which at the ends of its arms bears in each case the mentioned cap with a flange-type rim, and which, with the ends of the arms, abuts at the front end against the end electrodes, a spacer comprised of a disk-shaped fusible pellet and a cylindrical component having insulating properties being disposed there-between, and to provide the base of each end electrode with a depression to accommodate the fusible pellet and to radially center the cylindrical component. As a result, the additional protective device has an only slight effect on the axial length of the overvoltage surge arrester as a whole. This applies particularly when a contact ring of a weldable material is likewise soldered on to the base of the end electrodes for the radial contacting of the same.

DETAILED DESCRIPTION

Figure 1:
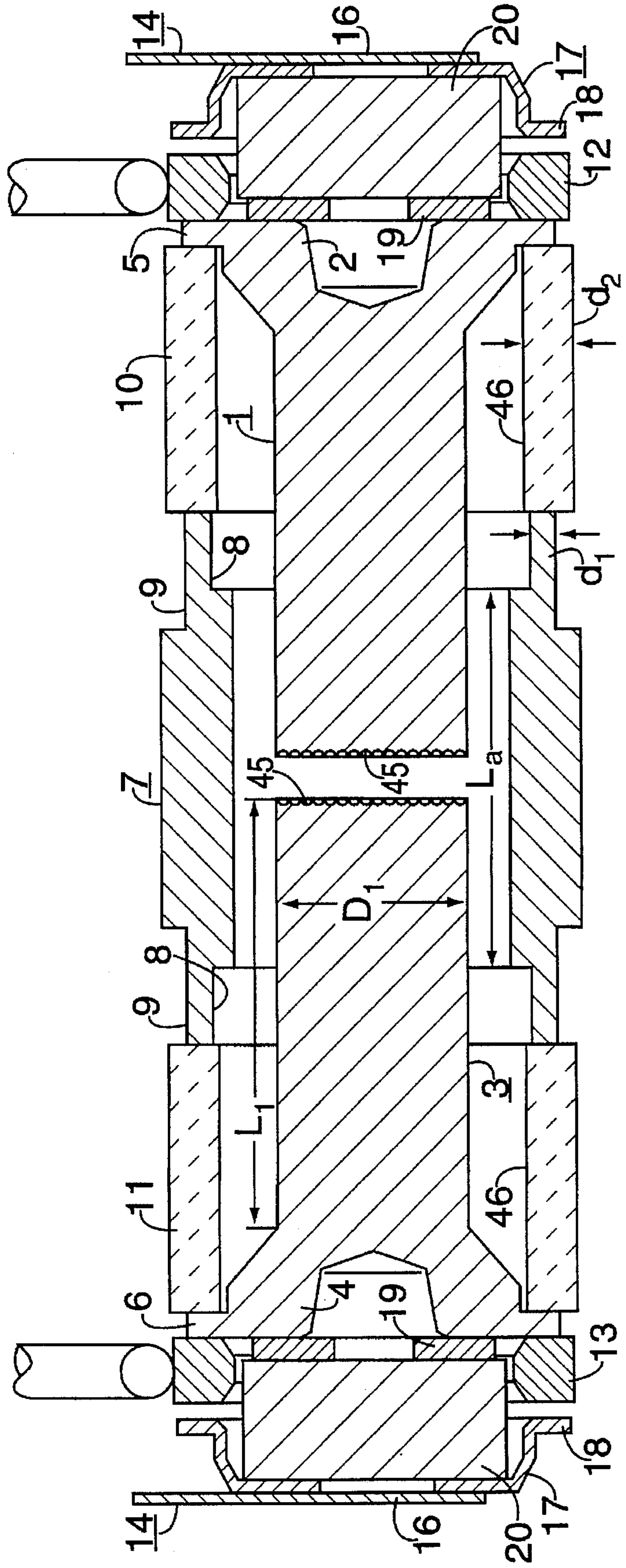
FIG. 1 and 2 depict a very slender overvoltage surge arrester with a middle electrode that is radially graduated both on the inner surface area, as well as on the outer surface area, and a mounted protective device.

The overvoltage surge arrester depicted in accordance with FIG. 1 is essentially comprised of the two cylindrical end electrodes 1 and 3, the middle electrode 7 arranged concentrically thereto, and the two hollow cylindrical ceramic members 10 and 11. The end electrodes 1 and 3 are made of copper, essentially have a cylindrical design, and are provided with a base 2 or 4, which gradually changes into a solder flange 5 or 6. The axial length $L_1$ of the cylindrical section of the end electrodes is about 8 mm, while the diameter $D_1$ of the end electrodes is about 3.5 mm. Thus, the volume of the cylindrical section amounts to about 77 $mm^3$. With respect to the dissipation of heat, it is more beneficial to provide a diameter of 4.5 mm, given an axial length of about 6 mm. The insulators 10 and 11 made of ceramic have a wall thickness $d_2$ of about 1 mm. The hollow cylindrical middle electrode 7 is provided on the inner circumferential surface at both ends with a radial graduation 8, through which means, inter alia, the active length $L_a$ of the middle electrode is defined. Furthermore, the middle electrode 7 is also provided on the outer periphery at both ends with a radial graduation 9. As a result of the inner and outer graduation, the wall thickness $d_1$ of the middle electrode 7 in the area adjoining the insulators 10 and 11 is reduced to a value of about 0.5 to 0.6 mm.

The middle electrode 7 and the insulators 10 and 11 are soldered to one another at the front end. In the same way, the insulators are soldered at the front end to the bases 2 and 4 of the end electrodes 1 and 3. Also, soldered to the solder flange 5 and 6 of the end electrodes are contact rings 12 or 13, which consist of a weldable material, for example of nickel or an iron alloy, with a coefficient of thermal expansion of about $120\times10^{-7}$/° C. Connecting wires may be welded on to these contact rings radially.

Figure 2:
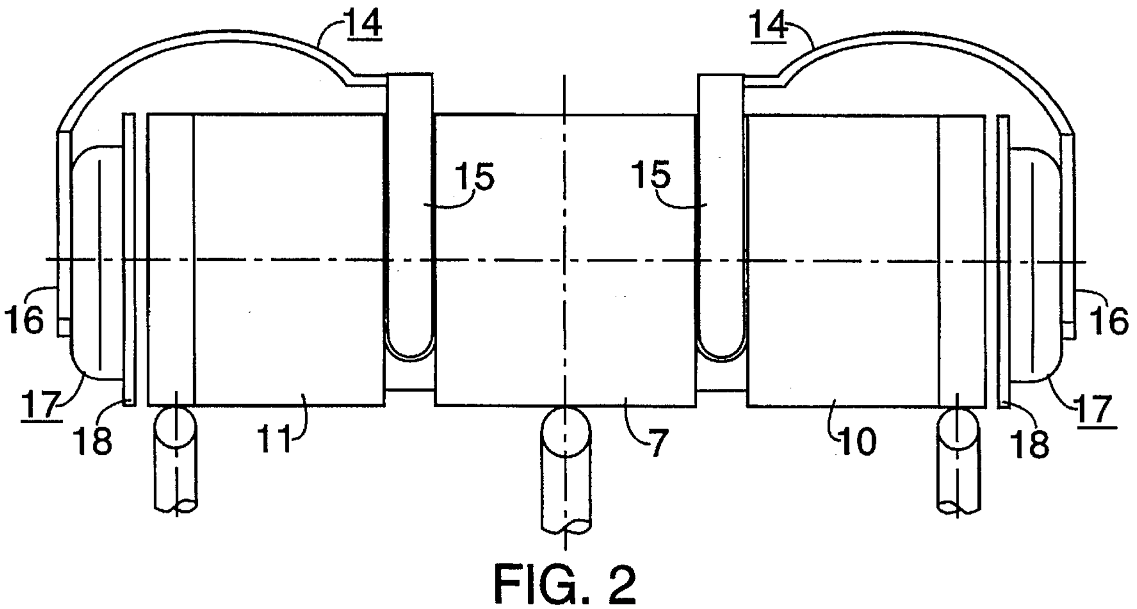

Also allocated to both end electrodes 1 and 3 are components of a protective device, whose structural design also proceeds from FIG. 2. To this protective device belong a fusible pellet 19 and a metal-oxide varistor 20, which are fixed radially in position by the contact ring 12 and 13, respectively. A cap 17, which gradually changes into a flange-like contact rim 18 and is mounted at the end 16 of the arm of a single-arm spring clip 14, is provided for axial positioning. The spring clip 14 is affixed to the middle electrode 7 by means of a bracket 15 in the area of an outer radial graduation of said middle electrode 7.

The active section of the middle electrode 7 having the length $L_a$ overlaps the length of the cylindrical areas of the two end electrodes 1 and 3 by about 40%.

To adjust the desired ignition properties of the depicted overvoltage surge arrester, the end electrodes are also coated at the front ends with an activating compound 45, and axially running ignition strips 46, which are uniformly distributed over the circumference and are alternately electrically interfaced with the corresponding end electrode and with the middle electrode, are mounted on the inner wall of the insulators 10 and 11.

Figure 3:
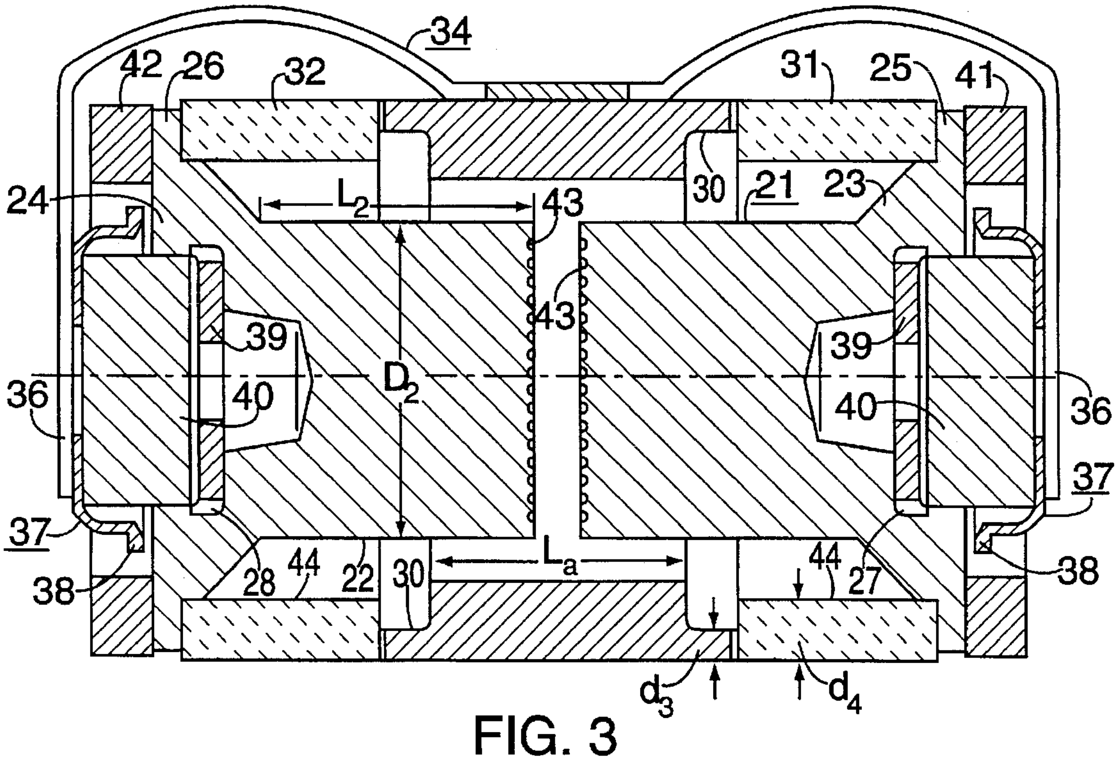
FIG. 3 depicts an overvoltage surge arrester with an especially short overall axial length and with spacers associated with the mounted protective device that run in depressions of the end electrodes.

The overvoltage surge arrester in accordance with FIG. 3 is more compact and, thus, axially shorter, but also radially somewhat thicker than the arrester in accordance with FIG. 1. In the same way as the arrester in accordance with FIG. 1, this arrester is comprised of two end electrodes 21 and 22, a middle electrode 29, and two hollow cylindrical insulators 31 and 32 having a wall thickness of $d_4$=1.2 mm. The insulators 31 and 32 in this case are soldered, on the one hand, at the front ends, to the solder flanges 25 and 26 of the bases 23 and 24; on the other hand, the middle electrode 29 and the two insulators 31 and 32 are soldered to one another at the front ends, the wall thickness $d_3$ of the middle electrode 29 being reduced to about 0.6 mm by radial graduations 30 in the area of the soldered connection point. In this exemplary embodiment, as well, the radial graduations 30 delimit the axial length $L_a$ of the middle electrode.

It is typical of the exemplary embodiment in accordance with FIG. 3 that the diameter $D_2$ Of the cylindrical section of the end electrodes 21 and 22 is more or less equal to the axial length $L_2$ of the cylindrical section, this cylindrical section having a volume of about 170 $mm^3$.

To achieve the desired ignition properties, in the case of this arrester as well, the end electrodes 21, 22 are coated at the front ends with an activating compound 43, and the insulators 31 and 32 are provided with axially running ignition strips 44.

For the additional protective device of the arrester, here a two-arm spring clip 34 is used, which is mounted by means of a bracket on the middle electrode 29 and which, at the ends 36 of the arms abutting axially on the end electrodes, bears a cap 37 in each case, whose flange-like contact rim 38 is spaced apart correspondingly from the base 23 or 24 of the respective end electrode. For this purpose, a spacer is used, which is comprised of the fusible pellet 39 and the metal-oxide varistor 40. The fusible pellet and varistor are radially fixed or carried in a recess 27 or 28 of the base of the respective end electrode. In this exemplary embodiment, the cap 37, together with the end 36 of the respective arm of the spring clip 34, only projects slightly axially over the contact ring 41 or 42 soldered on to the base 23 or 24.

It should also be mentioned that, because of the relatively large volume and the associated thermal capacity of the cylindrical area of the end electrodes, the base of the end electrodes does not get hot enough to activate the adjoining fusible pellet there when a nominal discharge current of about 200 amp flows.

What is claimed is:

1. A gas-filled overvoltage surge arrester, comprising:

a) two cylindrical end electrodes being made of copper, each having a flange-like base, and axially opposing one another, wherein a cylindrical section ($L_1$, $D_1$) of each of the end electrodes has a volume of at least 60 $mm^3$, and an axial length ($L_1$) of the cylindrical section is smaller than 2.5-times its diameter ($D_1$);

b) a middle electrode being made of copper, surrounding the two end electrodes over one section of their axial length, wherein the middle electrode has a hollow cylindrical design; and c) two hollow cylindrical insulators, each having a wall thickness of about 1 mm, and being disposed between the middle electrode and the bases of the end electrodes, wherein the middle electrode and the two hollow cylindrical insulators are soldered to one another at the front ends, an inner surface area of the middle electrode being provided in regions bordering the two insulators in each case with a radial graduation, and the middle electrode having a wall thickness ($d_1$) in the area of the soldered connection points, which amounts at the most to 60% of the wall thickness ($d_3$) of the insulators.

2. The overvoltage surge arrester according to claim 1, wherein the diameter ($D_1$) of the cylindrical section of the end electrodes amounts to at least 4.5 mm.

3. The overvoltage surge arrester according to claim 2, wherein the cylindrical section ($L_2$, $D_2$) of the end electrodes has a volume of at least 150 $mm^3$, the axial length ($L_2$) of the cylindrical section of the end electrodes being smaller than 1.5-times its diameter ($D_2$).

4. The overvoltage surge arrester according to claim 2, further comprising:

a) a two-arm spring clip affixed to the middle electrode;

b) two caps, each cap being arranged at one end of one arm of the two-arm spring clip, and each cap having a flange-type rim, wherein said clip with then ends of its arms abuts at a front end against the end electrodes; and c) a spacer being comprised of a disk-shaped fusible pellet and a cylindrical component having insulating properties being disposed where the arms abuts against the end electrodes, wherein each base of the end electrodes is provided with a depression to accommodate the fusible pellet and to radially center the cylindrical component.

5. The overvoltage surge arrester according to claim 4, further comprising a contact ring being soldered to the base of each end electrode at the front end, said contact ring being made of a weldable material, whose coefficient of thermal expansion amounts to about $120\times10^{-7}$/°C.

6. The overvoltage surge arrester according to claim 1, wherein the middle electrode, with its area of the inner surface area that is not graduated, surrounds the end electrodes over at least 35% of the length ($L_1$,$L_2$) of their cylindrical section.

7. The overvoltage surge arrester according to claim 1, further comprising a contact ring being soldered on to the base of each end electrode at the front end, said contact ring being made of a weldable material, whose coefficient of thermal expansion amounts to about $120\times10^{-7}$/°C.

8. The overvoltage surge arrester according to claim 7, further comprising:

a) a radial graduation being disposed in an external surface area of the middle electrode in those areas, which are adjacent to the two insulators;

b) a single-arm spring clip is affixed to the radial graduation, at the end of its arm, said spring clip bearing a cap with a flange-like rim, and abutting with the end of its arm at the front end against the one end electrode; and c) a spacer being disposed where the spring clip abuts the one end electrode, said spacer being comprised of a disk-shaped fusible pellet and a cylindrical component having insulating properties.

9. The overvoltage surge arrester according to claim 1, further comprising:

a) a two-arm spring clip affixed to the middle electrode;

b) two caps, each cap being arranged at one end of one arm of the two-arm spring clip, and each cap having a flange-type rim, wherein said clip with then ends of its arms abuts at a front end against the end electrodes; and c) a spacer being comprised of a disk-shaped fusible pellet and a cylindrical component having insulating properties being disposed where the arms abuts against the end electrodes, wherein each base of the end electrodes is provided with a depression to accommodate the fusible pellet and to radially center the cylindrical component.

10. The overvoltage surge arrester according to claim 9, further comprising a contact ring being soldered to the base of each end electrode at the front end, said contact ring being made of a weldable material, whose coefficient of thermal expansion amounts to about $120\times10^{-7}/°C$.

* * * * *